2 Sheets--Sheet 1.
D. PETERS.
Meat-Choppers.
No. 6,236. Reissued Jan. 19, 1875.
FIG. I.
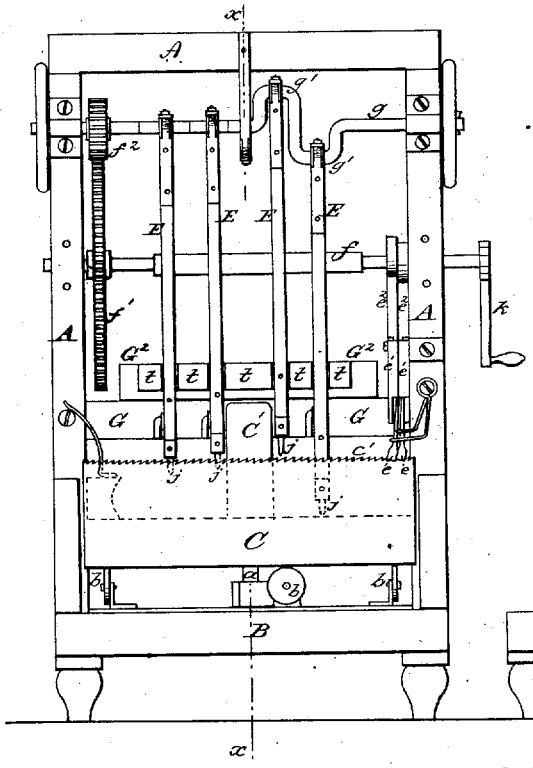
FIG. IV.
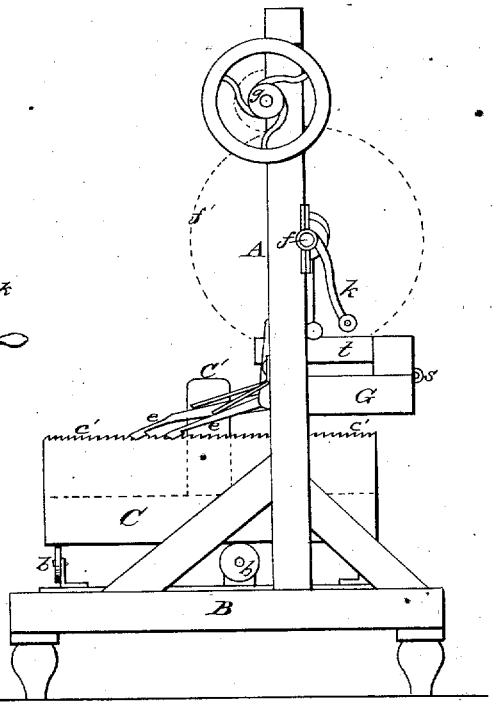
FIG. II.
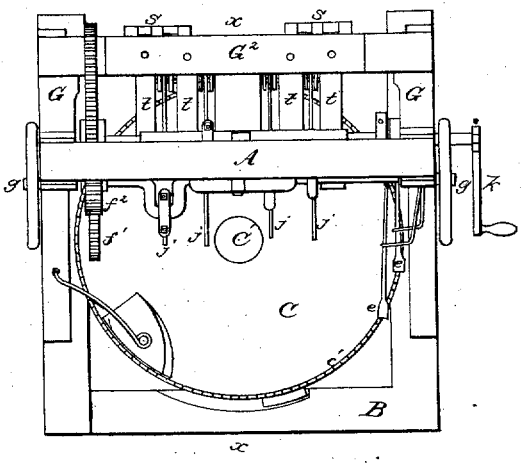
WITNESSES:
A. McCallum
H. G. Stuart
INVENTOR:
Daniel Peters,
By W. B. Richards, Atty.
THE GRAPHIC CO. PHOTO-LITH. 39 & 41 PARK PLACE, N.Y.

2 Sheets--Sheet 2.
D. PETERS.
Meat-Choppers.
No. 6,236. Reissued Jan. 19, 1875.
FIG. III.
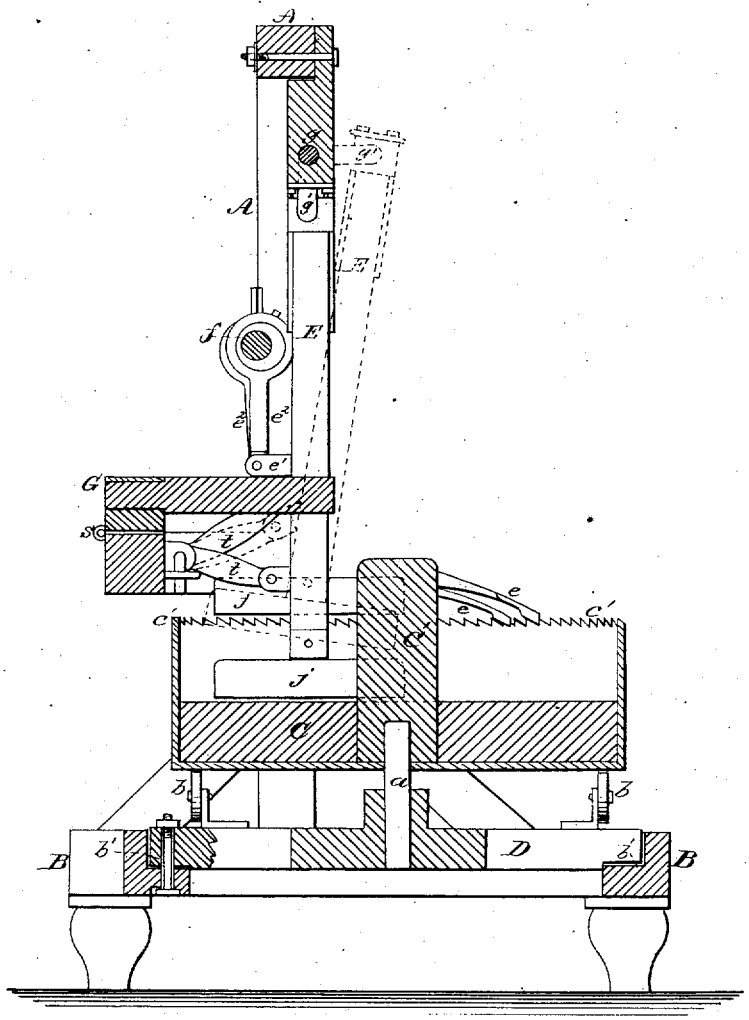
WITNESSES:
A. McCallum
D. G. Stuart
INVENTOR:
Dan'l. Peters,
By W. B. Richards,
Atty.
THE GRAPHIC CO. PHOTO-LITH. 39 & 41 PARK PLACE, N.Y.

UNITED STATES PATENT OFFICE.

DANIEL PETERS, OF BURLINGTON, IOWA, ASSIGNOR, BY MESNE ASSIGNMENTS, TO HIMSELF AND MURRAY IRON-WORKS COMPANY.

IMPROVEMENT IN MEAT-CHOPPERS.

Specification forming part of Letters Patent No. 123,725, dated February 13, 1872; reissue No. 6,236, dated January 19, 1875; application filed January 2, 1875.

DIVISION A.

*To all whom it may concern:*

Be it known that I, DANIEL PETERS, of Burlington, county of Des Moines and State of Iowa, have invented certain new and valuable Improvements in Meat-Choppers; and I do hereby declare that the following is a full, clear, and exact description of the construction and operation of the same, reference being had to the annexed drawings, making a part of this specification, and to the letters and figures of reference marked thereon.

Figure 1 is a front elevation of a machine embodying my invention. Fig. 2 is a top view. Fig. 3 is a vertical sectional view on the plane of the line *x x* in Fig. 1, and Fig. 4 is a side elevation.

Similar letters of reference indicate corresponding parts in all of the figures.

This invention relates to improvements in machines for chopping meat, of that class of machines in which the reciprocating movement of the chopping-blades is transmitted by connecting rods or handles from cranks, or equivalent devices, on a rotating shaft; and the invention consists, first, in the employment of a fulcrum with each connecting-rod, or with the blade which it carries, for the purpose of giving said blade a movement edgewise as it descends, and thus causing it to perform drawing cuts; second, it consists in connecting the fulcrum-links with the connecting-rods or with the blades in such manner as to reduce the friction between the parts to the minimum, all as hereinafter fully described.

In the annexed drawing, A represents an upright frame of rectangular form, which is erected upon a quadrangular base, B. The inner upper edges of the bars composing this base B have inclined depressions $b'$ formed into them, on the inclines of which the ends of four arms of a cross-frame, D, rest, so that, turning the latter about its center, it will rise or descend. By means of a bolt, which is passed through one of the arms, and also through a curved slot, the frame D can be fixed rigidly to its frame B after it is properly adjusted. Near the extremities of the arms of frame D are anti-friction wheels *b*, on which is supported a cylindrical chopping-block, C, which is fitted into a metallic shell, having ratchet-teeth $c'$ formed on its upper horizontal edge. The center pin, *a*, of the block C is received into a hub formed in the center of the cruciform frame D; and directly above this pin *a* a center post, C′, of cylindrical form, rises from the chopping-surface of the block, so as to prevent the accumulation of meat in the center of the block, where it would be out of the way of the cutting-blades or choppers *j*. Above the chopping-block C, and having its bearings in the uprights of frame A, is a driving-shaft, *f*, on the extreme outer end of which is a crank, *k*. There are two eccentrics keyed on the shaft *f*, which communicate alternate backward and forward movements to two pawls, *e e*, through the medium of angle-levers $e^1$ $e^1$ and connecting-rods $e^2$ $e^2$. The free hooded ends of the pawls *e e* are held down upon the ratchet-teeth $c'$ of the chopping-block case by springs, which are fastened to the frame A. By these means the chopping-block and its case receive together a slow intermittent rotary motion when the shaft *f* is turned, which keeps the meat on the block constantly moving beneath the choppers. Above the shaft *f*, but on the front side of the frame A, is another shaft, *g*, which receives motion from shaft *f* through a large spur-wheel, $f^1$, and a pinion, $f^2$. This shaft *g* has cranks $g'$ formed on it, and to each crank $g'$ a connecting rod or handle, E, is connected by a suitable strap, and carries on its lower end a blade or chopper, *j*. *t t t t* are links, one end of each link hinged or pivoted to the stationary frame G, and the other to the lower end of a rod or handle, E.

It will be evident to any one skilled in the art that the links *t* act as fulcrums, upon which the handles E have an oscillating movement, which is produced principally by the motion of the cranks $g'$, and somewhat increased from the effect of the links themselves, and that this oscillating movement will produce effectually the desired draw-cut of the chopping-blades.

The first and principal object in this improvement is providing fulcrums for the handles E, to give the drawing cut to the chopping-blades; and the second object is to so connect said fulcrums with the handles and the stationary frame as to allow their reciprocating vertically with the motion of the handles, while they also increase the extent of the draw in the cut, and at the same time offer no resistance, by friction or otherwise, to wear the parts, and require increased power to propel the machine.

What I claim as new, and desire to secure by Letters Patent, is—

1. The combination, with a meat-chopping machine, having choppers actuated by a crank-shaft through the medium of rods or handles, of fulcrums for said rods, which will give a drawing cut to the choppers, substantially as described, and for the purpose specified.

2. In combination with a meat-chopping machine, having choppers actuated by a crank-shaft through the medium of rods or handles, the links *t*, for increasing the amount of draw in the cut, substantially as described, and for the purpose specified.

DANIEL PETERS.

Witnesses:

DAVID W. GRIMES,

E. SLOSSON.